United States Patent Office 2,762,846
Patented Sept. 11, 1956

---

2,762,846

PRODUCTION OF BIS-PHENOLS BY CONDENSATION OF PHENOLS WITH KETONES CATALYZED BY HYDROGEN SELENIDE OR HYDROGEN TELLURIDE

Eugene J. Reiner, West Hartford, Conn., Herman S. Schultz, New York, N. Y., and Joseph G. Shuman, Plainfield, and Melvin Silberberg, Long Branch, N. J., assignors to Technical Tape Corp., New York, N. Y., a corporation of New York No Drawing. Application March 8, 1954,
Serial No. 414,858

13 Claims. (Cl. 260—619)

This invention relates to the preparation of reaction products from phenols and ketones, for example phenol and acetone, and it has particular relation to the preparation of such compounds in the presence of novel and highly efficient catalytic agents.

It has been known to prepare organic compounds of the type HO—R$_1$—R$_2$—R$_1$—OH, wherein R$_1$ is an aryl group and R$_2$ is a ketone residue, by condensation of a phenol with a ketone, in the preesnce of an acidic condensing agent, such as hydrochloric or sulphuric acid, with the addition of a catalyst, in the presence or absence of a solvent or diluent for the reactants and sulfur and ionizable sulfur components have been suggested as catalysts for the reaction. These organic compounds are hereinafter referred to generically as "bis-phenols."

The main object of the present invention is to provide a new and improved process for the preparation of bis-phenols from phenols and ketones, in which novel and improved catalytic substances are used. Other objects and the advantages of the invention will be apparent from the appended claims and the following specification which describes, by way of example, some embodiments of the invention.

In carrying out the present invention, phenol (C$_6$H$_5$OH) or its homologues or substituted phenols are reacted with a ketone in an acidic medium such as hydrochloric acid and in the presence of catalysts of the type described hereinafter. It has been found that hydrogen selenide and hydrogen telluride are highly active catalysts in the formation of bis-phenols from phenol-ketone reaction mixtures. Selenium and/or tellurium metals, or any compound of selenium and/or tellurium, from which hydrogen selenide or hydrogen telluride can be formed in the reaction mixture of phenol and ketone, can be used as catalysts according to the present invention. The mechanism of the reaction is not fully understood, perhaps even proceeding through a perselenide or pertelluride intermediary. It has been found that very satisfactory results are obtained by carrying out the phenol-ketone condensation with the catalysts of the invention in the presence of a minimum of 118 parts of hydrochloric acid or 36.5 parts of anhydrous hydrogen chloride in the reaction mixture, and with a molar ratio of phenol:ketone of, for example, 3:1, or with a higher excess of phenol, e. g. 4:1. A smaller excess of phenol, e. g. a molar ratio of 2.8 to 1, can also be used, but a molar ratio of 3:1, or more than 3:1 between phenol and ketone, gives better results. It is preferred to carry out the phenol-ketone condensation in the range of 30°–50° C., but higher temperatures of bis-phenol formation, e. g. 50° C. to 100° C., and lower temperatures, e. g. 25°–30° C., are also applicable. The phenol-ketone condensation is carried out with or without stirring and the reaction mixture is then allowed to stand, e. g. over night, or until crystallization is completed. The reaction product is separated, for example, by washing with water, subsequent filtration, and washing of the residue with water. The resultant product consists of a white crystalline material with melting point of 153°–156° C. The excess phenol is recovered in conventional manner.

The following examples describe some embodiments of the invention, to which the invention is not limited. The parts are by weight, if not otherwise stated.

Example 1

282 parts of phenol are mixed with 58 parts of acetone, with the addition of 0.015% of sodium selenide, based on the total weight of phenol+acetone, in a reaction vessel provided with a stirrer and a condenser. To the reaction mixture 160 parts of concentrated 37% aqueous hydrochloric acid are added under stirring, and the reaction mixture is kept at 35°–45° C. with stirring for three hours. At the end of this time, crystallization begins and is complete after an additional 3–8 hours. The product is washed with water and filtered. The cake is washed with an additional portion of water and the product dried at 45°–60° C. to constant weight. The yield of dried product is in excess of 90%. The bis-phenol thus obtained melts at 153°–156° C.

Example 2

This example is identical with Example 1 except that 120 parts of acid are used and a yield in excess of 80% is obtained.

Example 3

In the procedure described in Example 1, instead of 0.015%, the sodium selenide catalyst is used in an amount of 0.0075%, based on the total weight of phenol+acetone. The other steps, and conditions and results are substantially the same as in Example 1.

Example 4

In the procedure described in Example 1, 0.015% of cadmium selenide is used as catalyst instead of the sodium selenide, based on the total weight of phenol+acetone. The other steps and conditions are substantially the same as in Example 1. The yield of dried bis-phenol is in the range of 75–85%

Example 5

In the procedure described in Example 1, 0.015% of strontium selenide is used as catalyst, instead of the sodium selenide, based on the total weight of phenol+acetone. The other steps and conditions are substantially the same as in Example 1. The yield of dried bis-phenol amounts to 75%–80%.

Example 6

In the procedure described in Example 1, 0.015% of zinc selenide is used as catalyst, instead of the sodium selenide, based on the total weight of the phenol+acetone. The other steps and conditions are substantially the same as in Example 1. The yield of dried bsi-phenol amounts to 86%.

Example 7

In the procedure described in Example 1, the sodium selenide catalyst is used in the range of 0.000015% to 0.015% based on the total weight of phenol+acetone. The other steps and conditions are substantially the same as in Example 1.

Example 8

282 parts of phenol are mixed with 58 parts of acetone, with the addition of 0.030% of cadmium telluride, based on the total weight of phenol+acetone, in a reaction vessel provided with a stirrer and condenser. 160 parts of concentrated 37% aqueous hydrochloric acid are now introduced under stirring into the reaction mixture which is kept at 35°–45° C. with stirring for 3–4 hours. At the end of this time crystallization starts and is completed by allowing the reaction mixture to stand over night. The product is washed with water, filtered, and the residue is washed with another portion of water. The resulting product is dried at 45°–60° C. to constant weight. The yield of dried product, which melts at 153°–156° C., amounts to 87%.

*Example 9*

In the procedure described in Example 8, instead of the cadmium telluride catalyst, a catalyst of sodium telluride is used in the amount of 0.015% based on the total weight of phenol+acetone. The other steps and conditions are substantially the same as in Example 8.

*Example 10*

282 parts of phenol are mixed with 58 parts of acetone, with the addition of 0.030% of bismuth selenide, based on the total weight of phenol+acetone, in a reaction vessel provided with a stirrer and condenser. 160 parts of concentrated 37% aqueous hydrochloric acid are now introduced under stirring into the reaction mixture which is kept at 35°–45° C. with stirring for 3–4 hours. At the end of this time crystallization starts and is completed by allowing the reaction mixture to stand over night. The product is washed with water, filtered, and the residue is washed with another portion of water. The resulting produce is dried at 45°–60° C. The yield of dried product, which melts at 153°–156° C., amounts to 71%.

*Example 11*

This example is identical with Example 1 except that the reaction is conducted at 60 C. and the yield is in excess of 80%.

*Example 12*

This example is identical with Example 1 except that the reaction is conducted at 80° C. and the yield is in excess of 80%.

*Example 13*

This example is identical with Example 1 except that the reaction is conducted at 100° C. and the yield is in excess of 80%.

*Example 14*

282 parts of phenol are mixed with 58 parts of acetone and to the resulting mixture 160 parts of concentrated 37% aqueous hydrochloric acid was added. Into the mixture hydrogen selenide set free by acid from 0.5 g. of Al$_2$Se$_3$, is introduced. The reaction mixture is kept at 35° C. with stirring for 3 hours. At the end of this time crystallization begins and is complete after standing over night. The product is washed in water and filtered. The cake is washed with another portion of water and and the product dried at 50° C. to constant weight. The bis-phenol thus obtained melts at 153°–156° C.

Instead of the hydrogen selenide, an equivalent amount of hydrogen telluride can be used under otherwise equal conditions.

*Example 15*

In the procedure described in Example 1, 0.015% of colloidal red selenium metal obtained from the reactions of selenic acid and hydrazine hydrate is used instead of the sodium selenide, based on the total weight of phenol and acetone. The other steps and conditions are substantially the same as in Example 1. The yield of dried bis-phenol is 77%. Melting point is 151–154° C.

*Example 16*

In the procedure described in Example 1, 0.015% of metallic tellurium is used instead of the sodium selenide based on the total weight of phenol and acetone. The other steps and conditions are substantially the same as in Example 1. The yield of dried bis-phenol is 76%. M. P. 153–156.

*Example 17*

In the procedure described in Example 1, 282 gr. of phenol, and 58 gr. of acetone are reacted with 0.6 ml. of supercooled liquid selenic acid. The other steps and conditions are substantially the same as in Example 1. The yield of dried bis-phenol is in the range of 80–85%.

*Example 18*

In the procedure described in Example 1, 0.030% telluric acid is used instead of the sodium selenide based on the total weight of phenol and acetone. The other steps and conditions are substantially the same as in Example 1. The yield of dried bis-phenol is in the range of 70–75%.

*Example 19*

In the procedure described in Example 1, instead of the hydrochloric acid, substantially anhydrous hydrogen chloride is passed into the reaction mixture until such time as crystals of the product are observed. The other steps and conditions are substantially the same. The yield of dried product is in excess of 80%. The bis-phenol thus obtained melts at 153°–156° C.

It will be understood that the present invention is not limited to the specific steps, conditions and other details specifically disclosed above and can be carried out with various modifications. The reaction can be carried out with or without the use of a stirrer in a closed reaction vessel or in a reaction vessel provided with a reflux condenser. In addition to the catalysts specifically described in the above examples, other compounds of selenium and tellurium which in acidic media give rise to hydrogen selenide and/or telluride have likewise a catalytic effect on the formation of bis-phenols from phenols and ketones. Mixtures of two or more compounds of selenium and/or tellurium and mixtures of the selenium and/or tellurium catalysts can also be used. Examples of such mixtures are: 0.0075% of sodium selenide+0.0075% of cadmium selenide; 0.01% of cadmium selenide+0.005% of zinc selenide; 0.005% of sodium selenide+0.005% of cadmium selenide+0.005% of zinc selenide; 0.0075% of sodium telluride+0.0075% of cadmium telluride; 0.0075% of sodium selenide+0.0075% of sodium telluride; 0.003% of sodium selenide+0.003% of cadmium selenide+0.003% of cadmium telluride (all these amounts being based on the total weight of phenol+acetone). Although hydrogen chloride and hydrochloric acid have been set forth in the examples given, it is understood that equivalent acidic materials may be resorted to, such as sulphuric acid and hydrobromic acid, etc. The amount of catalyst added depends on the nature of the catalyst, the nature and/or proportions of the reactants and on the reaction conditions. It has been found that the use of 0.0005 to 0.1 g. of N$_2$Se, for one mole of the ketone, or the use of other selenium compounds containing an equivalent amount of Se or the use of a tellurium compound containing an equivalent amount of Te, is the best mode of carrying out the invention, and that above 0.1 g. the catalytic effect tends to diminish so that at a point in the region of 0.1 g. to 0.5 g., the results begin to become consecutively less and less and a point is reached when the use of additional catalyst has no substantial efficacy; and that the presence of catalyst in amounts less than 0.0005 g. produces a slower accelerating effect on the reaction speed.

Separation and purification of the phenol-ketone condensation product, and recovery of unreacted ingredients can take place in any suitable manner. The process of the invention can be carried out discontinuously or continuously and the ingredients can be mixed in any desired order. The acidic condensing agent can be added in one portion or in several portions.

The term "in an amount equivalent to" is used in the present claims to denote an amount of the catalyst, in which the amount of Se or Te is equivalent to the amount of Se present in the quantity of Na₂Se stated in the respective claims.

What is claimed is:

1. In a method wherein a phenol is reacted with a ketone in the presence of an acidic condensing agent, the step of promoting the reaction by carrying it out in the presence of a catalyst selected from a group consisting of hydrogen selenide and hydrogen telluride and compounds capable of forming hydrogen selenide and hydrogen telluride, respectively in the reaction mixture.

2. A process for preparing bis-phenols from a phenol and a ketone, comprising carrying out condensation of a phenol with a ketone in the presence of a catalyst selected from the group consisting of hydrogen selenide and hydrogen telluride and compounds capable of forming hydrogen selenide and hydrogen telluride, respectively, in the reaction mixture and in the presence of an acidic condensing agent.

3. A process as claimed in claim 2, in which the catalyst is used in an amount equivalent to an amount ranging from the region of 0.0001 to 0.0005 to the region of 0.1 to 0.5 g. of Na₂Se, for one gr.-mol of the ketone.

4. A process as claimed in claim 2, in which the catalyst is used in an amount equivalent to an amount in the range of 0.0005 to 0.1 g. of Na₂Se, for one gr.-mol of the ketone.

5. A process as claimed in claim 2, in which the acidic condensing agent is hydrochloric acid.

6. A process as claimed in claim 2, in which the acidic condensing agent is hydrochloric acid, the phenol is C₆H₅OH and the ketone is acetone.

7. A process as claimed in claim 2, in which the acidic condensing agent is hydrochloric acid, the phenol is C₆H₅OH and the ketone is acetone, at least 3 mols of phenol are condensed with 1 mol of acetone, the reaction is carried out in the range of 30° to 80° C. and the catalyst is used in an amount equivalent to an amount of Na₂Se in the range of .0005 gr. to 0.1 g., of Na₂Se, for one gr.-mol of acetone.

8. A process as claimed in claim 2, in which the acidic condensing agent is hydrochloric acid, the phenol is C₆H₅OH and the ketone is acetone, at least 3 mols of phenol are condensed with 1 mol of acetone, the reaction is carried out in the range of 30°–100° C. and the catalyst is used in an amount equivalent to an amount of Na₂Se in the range of 0.0005 to 0.1 g. of Na₂Se for one gr.-mol of acetone.

9. A process as claimed in claim 2, in which the catalyst used is Na₂Se.

10. A process as claimed in claim 2, in which the catalyst used is CdSe.

11. A process as claimed in claim 2, in which the catalyst used is ZnSe.

12. A process as claimed in claim 2, in which the catalyst used is CdTe.

13. A process as claimed in claim 2, in which the catalyst used is Na₂Te.

References Cited in the file of this patent
UNITED STATES PATENTS 2,359,242     Perkins et al. _____ Sept. 26, 1944